L. C. PEDERSON & R. WILLIS.
DEVICE FOR HOLDING BOTTLES, MAIL, AND THE LIKE.
APPLICATION FILED OCT. 8, 1909. RENEWED APR. 10, 1912.
1,032,497.
Patented July 16, 1912.
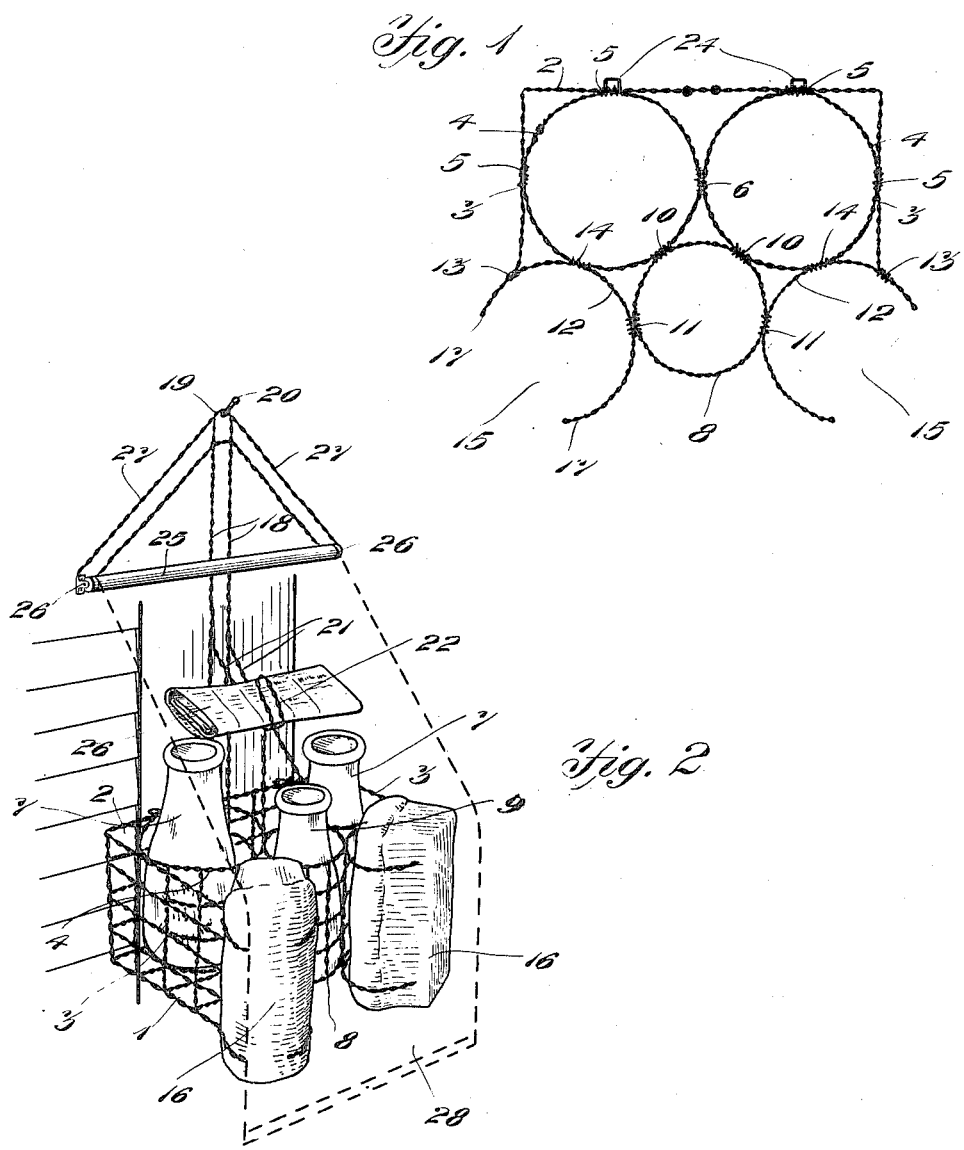
Witnesses
Inventor
Robert Willis
Louis C. Pederson
Attorney

UNITED STATES PATENT OFFICE.

LOUIS C. PEDERSON AND ROBERT WILLIS, OF PHILADELPHIA, PENNSYLVANIA.

DEVICE FOR HOLDING BOTTLES, MAIL, AND THE LIKE.

1,032,497. Specification of Letters Patent. Patented July 16, 1912.

Application filed October 8, 1909, Serial No. 521,706. Renewed April 10, 1912. Serial No. 689,902.

*To all whom it may concern:*

Be it known that we, LOUIS C. PEDERSON and ROBERT WILLIS, citizens of the United States, residing at Philadelphia, in the county of Philadelphia and State of Pennsylvania, have invented certain new and useful Improvements in Devices for Holding Bottles, Mail, and the Like, of which the following is a specification.

This invention relates to certain new and useful improvements in devices designed for holding milk bottles, mail and the like being designed to be readily attached or supported in any desired place as upon a door or some part of a building or other fit support and adapted to hold or retain milk bottles, loaves of bread or other packages left by the milk man, bread man or grocer or other person where it is desired to leave packages without the necessity of the occupants of the house going to the door.

It has for a further object to provide in connection with the same suitable means for protecting the packages from the weather as well as concealing the same from observation of the passerby.

It has for a further object to provide simple and yet efficient means whereby the door or other object to which the device is attached is prevented from being marred or otherwise injured.

Other objects and advantages of the invention will hereinafter appear and the novel features will be particularly pointed out in the appended claims.

The invention in its preferred form is illustrated in the accompanying drawings, which, with the numerals of reference marked thereon, form a part of this specification and in which, Figure 1 is a top plan view of our improved device with the upper portion thereof omitted. Fig. 2 is a perspective view showing the device in use.

Like numerals of reference indicate like parts throughout the several views.

Referring to the drawings, the device is constructed preferably of wire or analogous material and is composed of a top member 2, a bottom member 1 and ends 3. Rising from the bottom and disposed within the space between the back and ends are the baskets or holders 4 of wire or the like, having their adjoining portions secured to the back and ends by suitable means, as a wrapping of wire 5, while the adjoining center portions of the basket or holder are also held together by a wrapping of wire 6, or any other suitable material.

These holders or baskets are designed to hold milk bottles and the like, while in front of the said holders is a smaller one 8, designed to hold a small bottle 9 or the like or any other suitable object, this small basket being united to the adjoining members of the holder 4 by means of suitable wrappings of wire as seen in 10 and further by means of wrappings 11 to the adjoining holders 12, which in front are secured to the front ends of the sides 3, by wrappings 13 and to the adjoining portions of holders 4 by similar wrappings 14. The holders 12 are substantially semi-circular or slightly more than semi-circular, being open at the front ends as seen at 15, the said holders being sufficiently resilient so that when a loaf of bread or the like 16, is placed therein the free ends 17 will grasp the said loaf of bread or other article and hold it firm as seen in Fig. 2 without however, injury thereto.

Rising from the back are the supporting members 18 of wire or the like, terminating in a loop 19 by which the device may be secured over a nail or other suitable device 20, as shown in Fig. 2.

Extending from the supporting members 18 at a suitable distance above the top of the basket are the downwardly inclined portions 21 of wire or the like, the free ends of which terminate in a hook 22, which serves as means for holding a newspaper 23, mail matter or any other advantageous articles.

In order to prevent injury to the door or other part of the building to which the device may be attached we provide buffers or blocks 24 of rubber or analogous material, which project from the back 2 of the device as seen clearly in Fig. 1, being held in any suitable manner and adapted to engage the door or other support to prevent marring thereof.

In order to protect and shield the articles placed in the device from the weather and dust as well as from view, we provide a spring roller 25, of any well known form, supported in suitable brackets or bearings 26 at the outer ends of the outwardly inclined wires or other members 27, as seen clearly in Fig. 2, upon which is wound a curtain 28, of rubber or other similar material, preferably waterproof, which may be pulled up or down as indicated by the dotted lines in Fig. 2; to cover up the device and whatever is placed therein.

Modifications in detail may be resorted to without departing from the spirit of the invention or sacrificing any of its advantages.

What is claimed as new is:

1. A package holder consisting of a wire basket having three sides, bottle supporting means fixed to said basket, said bottle supporting means adapted to hold the sides of said basket against spreading.

2. A package holder consisting of a basket having three sides, bottle supporting means fixed thereto, spring clips fixed to the ends of two sides of said basket, and to said bottle supporting means, said clips and bottle supporting means adapted to hold said side ends against spreading.

3. A package holder consisting of a basket having three sides, bottle supporting means fixed thereto, spring clips fixed to the ends of two sides of said basket, and to said bottle supporting means, said clips and bottle supporting means adapted to hold said side ends against spreading, a supporting means for said basket, said supporting means provided with means for holding a screen over said basket.

In testimony whereof we affix our signatures, in presence of two witnesses.

LOUIS C. PEDERSON.
ROBERT WILLIS.

Witnesses:
GEORGE HENRY RUEPPEL,
ALBERT LAVINE LORCH.